United States Patent
Schramm et al.

(10) Patent No.: US 11,657,165 B2
(45) Date of Patent: May 23, 2023

(54) CRYPTOGRAPHY MODULE AND METHOD FOR OPERATING SAME

(71) Applicant: Robert Bosch GmbH, Stuttgart (DE)

(72) Inventors: Juergen Schramm, Bietigheim-Bissingen (DE); Alexander Meurer, Bochum (DE); Ramona Jung, Stuttgart (DE); Christoph Lenz, Backnang (DE); Andreas Weber, Weissach (DE); Florian Ziegler, Stuttgart (DE); Frederic Stumpf, Leonberg (DE); Ilias Sagar, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/055,035

(22) PCT Filed: May 22, 2019

(86) PCT No.: PCT/EP2019/063189
§ 371 (c)(1),
(2) Date: Nov. 12, 2020

(87) PCT Pub. No.: WO2019/242972
PCT Pub. Date: Dec. 26, 2019

(65) Prior Publication Data
US 2021/0216477 A1  Jul. 15, 2021

(30) Foreign Application Priority Data

Jun. 20, 2018 (DE) .......................... 102018209965.0
Jul. 13, 2018 (DE) .......................... 102018211752.7
Aug. 13, 2018 (DE) .......................... 102018213618.1

(51) Int. Cl.
*G06F 21/60* (2013.01)
*G06F 12/14* (2006.01)
(Continued)

(52) U.S. Cl.
CPC .......... *G06F 21/602* (2013.01); *G06F 9/4401* (2013.01); *G06F 12/1408* (2013.01);
(Continued)

(58) Field of Classification Search
CPC .. G06F 21/602; G06F 9/4401; G06F 12/1408; G06F 21/51; G06F 21/567;
(Continued)

(56) References Cited

U.S. PATENT DOCUMENTS

| 10,025,954 B2 * | 7/2018 | Emele ..................... G06F 21/72 |
| 2005/0193217 A1 * | 9/2005 | Case ....................... G06F 21/57 726/22 |

(Continued)

FOREIGN PATENT DOCUMENTS

| DE | 102009046436 A1 | 5/2011 |
| EP | 1273993 A2 | 1/2003 |

OTHER PUBLICATIONS

Security Requirements for Cryptographic Modules, FIPS Pub 140-2, NIST (Year: 2001).*

(Continued)

*Primary Examiner* — Shanto Abedin
(74) *Attorney, Agent, or Firm* — Norton Rose Fulbright US LLP; Gerard Messina

(57) ABSTRACT

A cryptography module for a computing device. The cryptography module is designed to check at least one memory area of a memory device which the computing device may access, as the result of which a result of the check is obtained, and to store the result at least temporarily.

14 Claims, 2 Drawing Sheets

(51) Int. Cl.
  G06F 21/57 (2013.01)
  G06F 21/64 (2013.01)
  G06F 21/79 (2013.01)
  H04L 9/32 (2006.01)
  G06F 9/4401 (2018.01)
  G06F 21/51 (2013.01)
  G06F 21/56 (2013.01)

(52) U.S. Cl.
  CPC ............ G06F 21/51 (2013.01); G06F 21/567 (2013.01); G06F 21/57 (2013.01); G06F 21/575 (2013.01); G06F 21/64 (2013.01); G06F 21/79 (2013.01); H04L 9/3242 (2013.01); *G06F 2212/1052* (2013.01); *G06F 2221/03* (2013.01)

(58) Field of Classification Search
  CPC ........ G06F 21/57; G06F 21/575; G06F 21/64; G06F 21/79; H04L 9/3242
  See application file for complete search history.

(56) References Cited

U.S. PATENT DOCUMENTS

| | | | | |
|---|---|---|---|---|
| 2006/0047933 | A1* | 3/2006 | Morais | G06F 21/57 711/163 |
| 2009/0300312 | A1* | 12/2009 | Handschuh | G06F 21/554 711/E12.001 |
| 2009/0327678 | A1 | 12/2009 | Dutton et al. | |
| 2011/0047376 | A1* | 2/2011 | Mittal | G06F 12/1408 713/164 |
| 2011/0145598 | A1* | 6/2011 | Smith | G06F 21/554 712/30 |
| 2011/0154059 | A1* | 6/2011 | Durham | G06F 21/79 711/163 |
| 2012/0144140 | A1* | 6/2012 | Rossa | G06F 12/1425 711/E12.091 |
| 2013/0117578 | A1* | 5/2013 | Ihle | G06F 12/1425 713/193 |
| 2014/0362711 | A1* | 12/2014 | Jiang | H04W 24/02 370/252 |
| 2017/0149569 | A1* | 5/2017 | Prabhu | B25F 5/00 |
| 2018/0150637 | A1* | 5/2018 | Filimon | G06F 21/575 |
| 2018/0157841 | A1* | 6/2018 | Shin | G06F 21/44 |
| 2019/0286823 | A1* | 9/2019 | Walrant | H04L 9/3236 |

OTHER PUBLICATIONS

International Search Report for PCT/EP2019/063189, dated Jul. 22, 2019.

Dworkin, Morris, "Recommendation for Block Cipher Modes of Operation: The CMAC Mode for Authentication," NIST Special Publication 800-38B, 2005, pp. 1-21. <https://doi.org/10.6028%2fnist.sp.800.38B> Downloaded on Nov. 11, 2020.

* cited by examiner

CRYPTOGRAPHY MODULE AND METHOD FOR OPERATING SAME

FIELD

The present invention relates to a cryptography module. Moreover, the present invention relates to a method for operating such a cryptography module.

BACKGROUND INFORMATION

A cryptographic hardware module is described in German Patent Application No. DE 10 2009 046436 A1.

SUMMARY

An object of the present invention is to provide a cryptography module that has increased functional value.

In accordance with an example embodiment of the present invention, this object may be achieved in that the cryptography module is designed to check at least one memory area of a memory device which the computing device may access, as the result of which a result of the check is obtained, and to store the result at least temporarily. The option is thus advantageously provided to check a content of the at least one memory area, for example for deviations from a predefinable content. It is thus advantageously possible, for example, for the computing device to prevent the execution of computer programs that are unsecure or compromised by an attacker.

In preferred specific embodiments of the present invention, the memory device may be situated externally to the cryptography module and the computing device. However, in further preferred specific embodiments the memory device may also be integrated into the computing device. In even further preferred specific embodiments, a system on a chip (SoC) may advantageously also be provided which includes the computing device, the memory device, and the at least one cryptography module according to the specific embodiments. In this case, the computing device, the memory device, and the at least one cryptography module may be situated, for example, on a shared semiconductor substrate, resulting in a particularly compact configuration.

In further preferred specific embodiments of the present invention, the computing device may include at least one processor core and/or a microprocessor and/or a microcontroller and/or a digital signal processor (DSP) and/or a programmable logic module (an FPGA, for example) or the like.

In further preferred specific embodiments of the present invention, it is provided that the cryptography module is designed to check multiple memory areas of the memory device or multiple computer programs stored in the memory device, in particular the cryptography module periodically checking the multiple memory areas of the memory device or the multiple computer programs. In this way, multiple memory areas or computer programs stored in the memory areas may be advantageously checked for the computing device, for example, the periodic check providing further increased security against manipulations and/or a randomly occurring change in the content of the memory area(s). It is understood that, using the features according to the specific embodiments, it is also possible to check data (for example, in contrast to computer programs that are executable by the computing device) for integrity or agreement with predefinable reference data. In further specific embodiments, it is also possible to check data as well as computer programs that may be associated in each case with, for example, a corresponding memory area or the same memory area of the memory device.

In further preferred specific embodiments of the present invention, it is provided that the cryptography module is designed to a) check the at least one memory area at at least one randomly or pseudorandomly selected point in time, and/or b) check the multiple memory areas, at least occasionally, in a random or pseudorandom sequence. This means that in further specific embodiments, during a first operating phase a random or pseudorandom sequence, for example, may be used for the check, and during a second operating phase some random or pseudorandom sequence other than that stated for the first operating phase may also be selected.

In further preferred specific embodiments of the present invention, it is provided that the cryptography module is designed to at least temporarily store the result of the check in a volatile and/or nonvolatile manner (in a flash EEPROM memory, for example).

In further preferred specific embodiments of the present invention, it is provided that the result of the check of a memory area includes at least one truth value that characterizes the result of the check; for example, for a negative check (i.e., for example in the event of manipulation of the considered data of the checked memory area) the value is "TRUE."

In further preferred specific embodiments of the present invention, it is provided that multiple truth values that are associated in each case with checked memory areas of the memory device as the result undergo an OR operation in order to ascertain an overall result, in particular the overall result characterizing whether at least one result of the multiple checked memory areas of the memory device is negative.

In further preferred specific embodiments of the present invention, it is provided that the cryptography module is designed to store at least temporarily the overall result in a volatile and/or nonvolatile manner.

In further preferred specific embodiments of the present invention, it is provided that the cryptography module is designed to carry out the check of the at least one memory area using a cipher-based message authentication code (CMAC). A particularly efficient check is thus made possible. An Internet publication that deals with an example of a design of the CMAC method is available at doi.org/10.6026%2rnist.sp.800-38b, for example.

In further preferred specific embodiments of the present invention, it is provided that the cryptography module includes a memory unit, preferably integrated into the cryptography module, for storing at least one reference value and/or a reference layout for the at least one memory area. In preferred specific embodiments, the reference value may represent, for example, a CMAC value for a predefinable memory content that may be compared, for example, to a CMAC value that has been ascertained by the cryptography module when checking the at least one memory area. If the ascertained CMAC value differs from the reference value, an unreliable change in the memory content of the checked memory area may be deduced.

In further preferred specific embodiments of the present invention, it is provided that the cryptography module is designed to carry out the check as a function of the reference value. In these specific embodiments, the check includes, for example, the formation of a CMAC value as a function of the memory content of the at least one memory area, and a comparison of the CMAC value thus formed to the reference value, which is stored, for example, in the memory unit of the cryptography module.

In further preferred specific embodiments of the present invention, it is provided that the cryptography module is designed to initiate an error response when at least one result and/or the overall result are/is negative, in particular the error response including at least one of the following measures: a) resetting the computing device, and/or resetting the computing device and the cryptography module, b) transmitting an interrupt request to the computing device (for this purpose, a separate data link may optionally be provided for transmitting the interrupt request to the computing device), c) blocking an access of the computing device to cryptographic keys that are stored in the cryptography module or providable by the cryptography module, and/or to other first data, d) preventing the execution of a bootloader of the computing device, in particular by reset holding, i.e., holding in a reset state, of the computing device, e) providing the result and/or overall result for the computing device and/or transmitting the result and/or overall result to the computing device.

In further preferred specific embodiments of the present invention, it is provided that the cryptography module is designed to establish within the scope of the check whether a content of the at least one memory area corresponds to a predefinable memory content.

In further preferred specific embodiments of the present invention, it is provided that the at least one memory area includes at least one computer program, in particular a bootloader for the computing device, that is provided for execution on the computing device.

In further preferred specific embodiments of the present invention, it is provided that the cryptography module is designed to provide the computing device with first data, in particular cryptographic keys, in particular the cryptography module being designed to provide the computing device with the first data only partially, or not at all, as a function of the check.

Further preferred specific embodiments of the present invention relate to a method for operating a cryptography module, in particular for a computing device, the cryptography module checking at least one memory area of a memory device which the computing device may access, as the result of which a result of the check is obtained, and the result is at least temporarily stored.

In further preferred specific embodiments of the present invention, it is provided that the cryptography module checks multiple memory areas of the memory device, in particular the cryptography module a) periodically checking the multiple memory areas of the memory device, in particular the cryptography module checking the at least one memory area at at least one randomly or pseudorandomly selected point in time, and/or b) checking the multiple memory areas at least occasionally in a random or pseudorandom sequence, in particular the cryptography module storing the result of the check, at least temporarily, in a volatile and/or nonvolatile manner.

Further advantageous specific embodiments of the present invention are described herein.

Further features, application options, and advantages of the present invention result from the following description of exemplary embodiments of the present invention illustrated in the figures. All described or illustrated features, alone or in any arbitrary combination, constitute the subject matter of the present invention, regardless of their wording or illustration in the description or figures, respectively.

DETAILED DESCRIPTION OF EXAMPLE EMBODIMENTS

Figure 1:
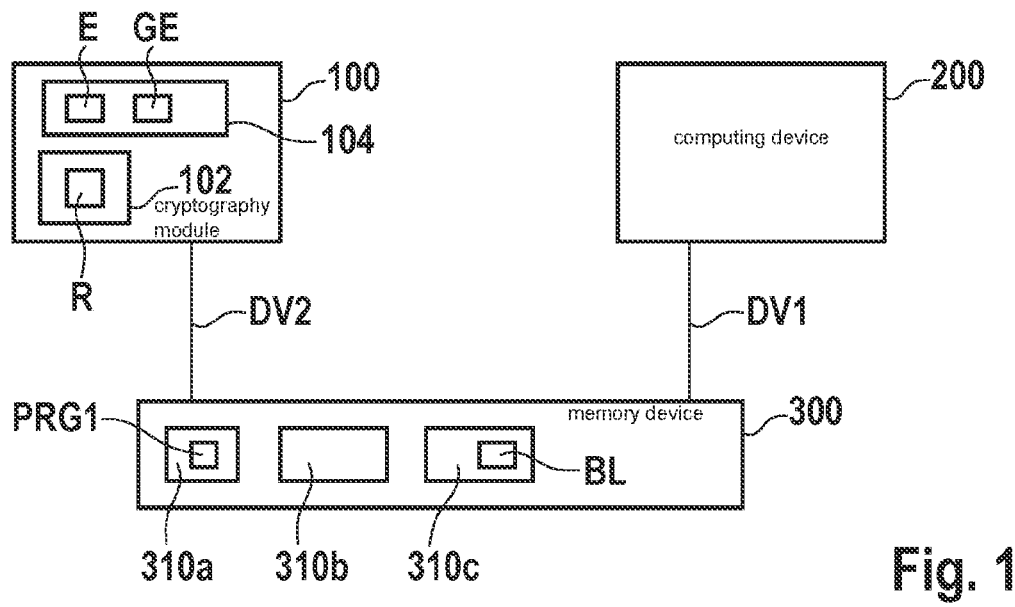
FIG. 1 schematically shows a simplified block diagram of a cryptography module according to one specific embodiment of the present invention.

FIG. 1 schematically shows a simplified block diagram of a cryptography module 100 according to one specific embodiment. Cryptography module 100 may be utilized for monitoring at least one computing device 200, in particular for monitoring a memory device 300 associated with computing device 200, and/or for at least temporarily controlling an operation of the at least one computing device 200.

Computing device 200 is a microcontroller or microprocessor, for example. Computing device 200 may execute computer programs, which in preferred specific embodiments are at least temporarily stored in memory device 300 (for example, a working memory (RAM) and/or flash EEPROM and/or some other, in particular (re-)writable, memory). As an example, in the present case memory device 300 includes three memory areas 310a, 310b, 310c, and in the present case a first computer program PRG1 for computing device 200 is stored in first memory area 310a. Computing device 200 may make at least read access to memory device 300 via first data link DV1 in order to load first computer program PRG1. In general, one or multiple computer programs may be stored in each memory area 310a, 310b, 310c, which computing device 200 may load via first data link DV1 and then optionally also execute, for example, a bootloader BL for computing device 200, i.e., a computer program that is executed first after an initialization of computing device 200. As soon as it is executed, bootloader BL may then, for example, control the subsequent loading and/or execution of at least one further computer program PRG1 by computing device 200.

Cryptography module 100 is designed to check at least one memory area 310a, 310b, 310c of memory device 300 which computing device 200 may access (see step 400 of the simplified flowchart from FIG. 3), as the result of which a result of the check is obtained. After check 400, cryptography module 100 (FIG. 1) at least temporarily stores the result of check 400 (see step 410 (FIG. 3)). The option is thus advantageously provided to check a content of the at least one memory area 310a, for example for deviations from a predefinable content. It is thus advantageously possible, for example, for computing device 200 to prevent the execution of computer programs that are unsecure or compromised by an attacker.

In preferred specific embodiments, the check on the side of cryptography module 100 takes place essentially independently from an operation of computing device 200, so that the operation of computing device 200 is not interrupted by the check, and vice versa.

In further preferred specific embodiments, memory device 300 may be situated externally to cryptography module 100 and computing device 200, as schematically illustrated in FIG. 1. Access of cryptography module 100 to memory device 300 takes place via a second data link DV2 which is preferably separate from first data link DV1. However, in further specific embodiments, data links DV1, DV2 may also be implemented with the aid of a shared bus system.

Figure 2:
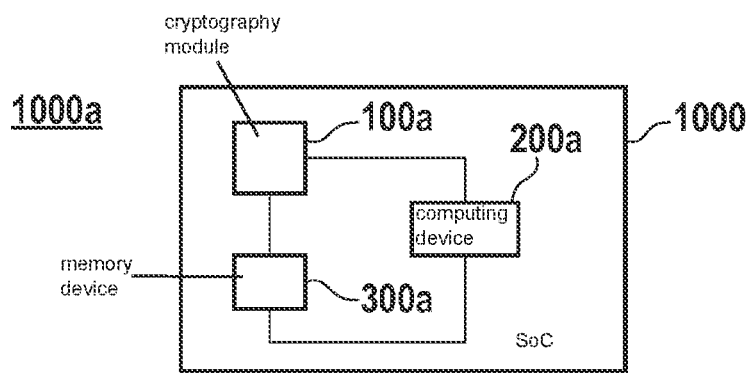
FIG. 2 schematically shows a simplified block diagram of a cryptography module according to a further specific embodiment of the present invention.

In further preferred specific embodiments, memory device 300 may also be integrated into computing device 200 (not shown). In even further preferred specific embodiments (see FIG. 2), a system on a chip 1000 (SoC), which includes computing device 200a, memory device 300a, and at least one cryptography module 100a according to the specific embodiments, may also advantageously be provided. In this case, computing device 200a, memory device 300a, and the at least one cryptography module 100a are thus situated on a shared semiconductor substrate 1000a, resulting in a particularly compact configuration.

In further preferred specific embodiments, it is provided that cryptography module 100, 100a is designed to check multiple memory areas 310a, 310b, 310c of memory device 300, in particular cryptography module 100, 100a periodically checking multiple memory areas 310a, 310b, 310c of memory device 300. In this way, multiple memory areas or computer programs PRG1, BL stored in the memory areas may advantageously be checked for computing device 200, for example, the periodic check providing further increased security against manipulations and/or a randomly occurring change in the content of the memory area(s).

In further preferred specific embodiments, it is provided that cryptography module 100 (FIG. 1), 100a is designed to a) check the at least one memory area 310a, 310b, 310c (FIG. 1) at at least one randomly or pseudorandomly selected point in time, and/or b) check multiple memory areas 310a, 310b, 310c, at least occasionally, in a random or pseudorandom sequence. This means that in further specific embodiments, during a first operating phase a random or pseudorandom sequence, for example, may be used for the check, and during a second operating phase some random or pseudorandom sequence other than that stated for the first operating phase may be selected, for example a determinate sequence, for example dependent on the position of memory areas 310a, 310b, 310c in an address space of memory device 300.

Figure 3:
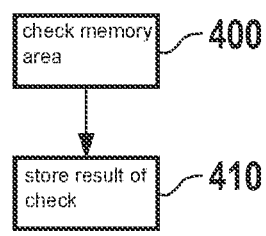
FIG. 3 schematically shows a simplified flowchart of a method according to one specific embodiment of the present invention.

In further preferred specific embodiments, it is provided that cryptography module 100, 100a is designed at least temporarily to store the result of check 400 (FIG. 3) in a volatile and/or nonvolatile manner (in a flash EEPROM memory, for example) (see step 410 from FIG. 3).

In further preferred specific embodiments, it is provided that the result of the check of a memory area includes at least one truth value that characterizes the result of the check; for example, for a negative check the value is "TRUE."

In further preferred specific embodiments, it is provided that multiple truth values that are associated in each case with checked memory areas of memory device 300 as the result undergo an OR link in order to ascertain an overall result, in particular the overall result characterizing whether at least one result of the multiple checked memory areas of the memory device is negative.

In further preferred specific embodiments, it is provided that cryptography module 100, 100a is designed to at least temporarily store the overall result in a volatile and/or nonvolatile manner.

Figure 4:
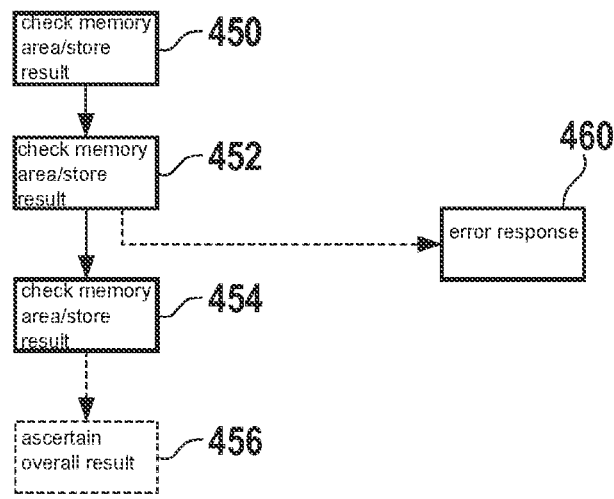
FIG. 4 schematically shows a simplified flowchart of a method according to a further specific embodiment of the present invention.

FIG. 4 shows by way of example a simplified flowchart according to a further specific embodiment. Cryptography module 100, 100a initially checks memory area 310c (FIG. 1) of memory device 300 according to a (pseudo)randomly selected sequence, in step 450. After the check of memory area 310c, cryptography module 100, 100a also optionally stores the associated result in step 450. Cryptography module 100, 100a checks memory area 310a (FIG. 1) of memory device 300 in step 452. After the check of memory area 310a, cryptography module 100, 100a also optionally stores the associated result in step 452. Cryptography module 100, 100a checks memory area 310b (FIG. 1) of memory device 300 in step 454. After the check of memory area 310b, cryptography module 100, 100a also optionally stores the associated result in step 454. In likewise optional step 456, cryptography module 100, 100a ascertains an overall result with regard to steps 450, 452, 454 of the checks of individual memory areas 310a, 310b, 310c, which likewise may be optionally stored, at least temporarily, by cryptography module 100, 100a. In further specific embodiments, steps 450, 452, 454 are preferably at least partially repeated, in particular periodically repeated (optionally also in an alternating sequence), so that at least some, preferably all, memory areas 310a, 310b, 310c of memory device 300 are checked multiple times. For example, the sequence described above by way of example with reference to FIG. 4 may be repeated as soon as step 454 or optional step 456 has been completed.

For example, in further preferred specific embodiments an error response 460 may be initiated as soon as a check result (of an individual memory area; in the present case, see step 452, for example) and/or the overall result have/has been found to be negative. Thus, in further preferred specific embodiments it is provided that cryptography module 100, 100a is designed to initiate an error response 460 when at least one result and/or the overall result are/is negative, in particular the error response including at least one of the following measures: a) resetting computing device 200, and/or resetting computing device 200 and cryptography module 100, b) transmitting an interrupt request to computing device 200, c) blocking an access of computing device 200 to cryptographic keys that are stored in cryptography module 100 or providable by the cryptography module, and/or to other first data, d) preventing the execution of a bootloader BL (FIG. 1) of computing device 200, in particular by reset holding, i.e., holding in a reset state, of computing device 200, e) providing the result and/or overall result for computing device 200 and/or transmitting the result and/or overall result to computing device 200, f) starting a bootloader BL of computing device 200 (in particular if this bootloader BL has previously been successfully verified as not changed or manipulated).

In further preferred specific embodiments, it is provided that cryptography module 100, 100 a is designed to check 400 (FIG. 3) or 450, 452, 454 (FIG. 4) the at least one memory area using a cipher-based message authentication code (CMAC). A particularly efficient check is thus made possible. An Internet publication that deals with an example of a design of the CMAC method is available at doi.orq/10.6028%2Fnist.sp.800-38b, for example.

In further preferred specific embodiments, it is provided that cryptography module 100, 100a includes a memory unit 102 (FIG. 1), preferably integrated into cryptography module 100, for storing at least one reference value R and/or a reference layout for the at least one memory area 310*a*, 310*b*, 310*c*. In preferred specific embodiments, reference value R may represent, for example, a CMAC value for a predefinable memory content that may be compared, for example, to a CMAC value that has been ascertained by the cryptography module when checking the at least one memory area. If the ascertained CMAC value differs from the reference value, an inadmissible change in the memory content of the checked memory area may be deduced.

It is also preferred that cryptography module 100 may also include a result memory 104 for at least temporarily storing result E (FIG. 1) of at least one check (step 400 from FIG. 3 or steps 450, 452, 454 from FIG. 4) and/or overall result GE (FIG. 1).

In further preferred specific embodiments, it is provided that cryptography module 100, 100*a* is designed to carry out check 400 as a function of reference value R. In these specific embodiments, the check includes, for example, the formation of a CMAC value as a function of the memory content of the at least one memory area, and a comparison of the CMAC value thus formed to the reference value, which is stored, for example, in the memory unit of the cryptography module.

For example, cryptography module 100 may load first computer program PRG1 or the entire content of memory area 310*a* of memory device 300 (possibly also block-by-block, then preferably also with block-by-block CMAC formation), for example via second data link DV2. Cryptography module 100 then forms a CMAC value via loaded first computer program PRG1 or the entire content of memory area 310*a* of memory device 300. This CMAC value may then be compared to the corresponding reference value for first computer program PRG1 or to the entire content of memory area 310*a* of memory device 300, which, for example, is generated in advance, for example during the manufacture of cryptography module 100, in a secured environment and preferably stored in cryptography module 100 in such a way that it is accessible only to cryptography module 100.

In further preferred specific embodiments, it is provided that cryptography module 100, 100*a* is designed to establish within the scope of the check whether a content of the at least one memory area corresponds to a predefinable memory content. This corresponds to step 400, for example. In addition to the preferably used CMAC method, for this purpose in further specific embodiments it is also possible to use other methods for comparing data. A result E obtained therefrom may be at least temporarily stored in result memory 104.

In further preferred specific embodiments, it is provided that the at least one memory area 310*a*, 310*b*, 310*c* includes at least one computer program PRG1, optionally also a bootloader BL for computing device 200, for execution on the computing device.

In further preferred specific embodiments, it is provided that cryptography module 100, 100*a* is designed to provide the computing device with first data, in particular cryptographic keys, in particular cryptography module 100, 100*a* being designed to provide computing device 200 with the first data only partially, or not at all, as a function of check 400.

Figure 5:
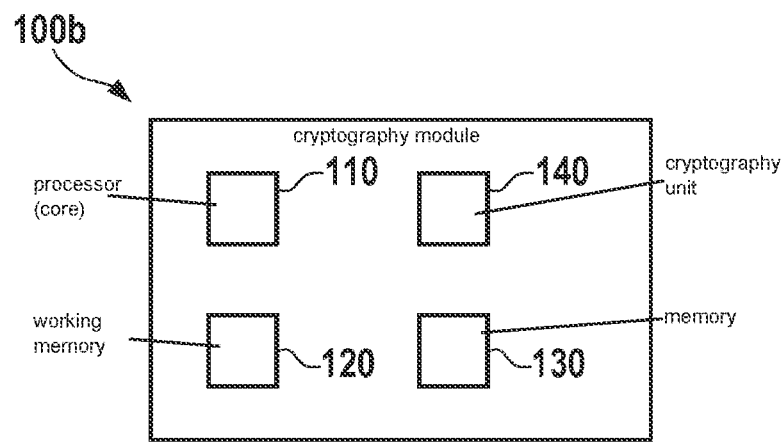
FIG. 5 schematically shows a simplified block diagram of a cryptography module according to a further specific embodiment of the present invention.

FIG. 5 schematically shows a simplified block diagram of a cryptography module 100*b* according to a further specific embodiment. Cryptography module 100*b* includes a processor core or processor 110, a working memory 120, a non-volatile memory 130 (flash EEPROM, for example), and optionally a cryptography unit 140 that is designed to execute one or multiple cryptographic algorithms or at least portions of same. For example, cryptography unit 140 may be designed to carry out the above-described ascertainment of CMAC values for check 400 (FIG. 3). Cryptography module 100, 100*a*, 100*b* may store results E thus obtained or overall result GE (FIG. 1) in memory 130 (FIG. 5), for example. For example, a predefinable address area of memory 130 may be used to implement the result memory. For example, the functionality of memory unit 102 according to FIG. 1 may also be implemented by memory 130 according to FIG. 5.

In further preferred specific embodiments, it is provided that cryptography module 100, 100*a*, 100*b* stores obtained results E of check 400 or overall result GE in a memory 104 (FIG. 1), to which computing device 200 may make read access (and preferably only read access). In this way, by controlling a computer program, computing device 200 with the aid of cryptography module 100, 100*a*, 100*b* may read ascertained results E or overall result GE, for example essentially unsynchronized with respect to an operation of computing device 200, and optionally carry out a response itself, for example initiate an error response.

Figure 6:
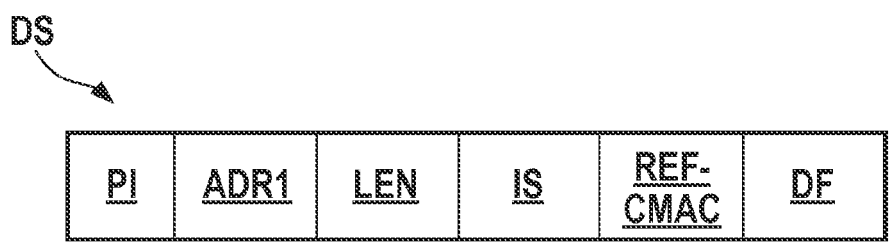
FIG. 6 schematically shows a data structure according to one specific embodiment of the present invention.

FIG. 6 schematically shows a data structure DS according to further preferred specific embodiments. Data structure DS may be used, for example, to store CMAC reference values or a reference layout or the like for cryptography module 100, for example in memory unit 102 of cryptography module 100. In preferred specific embodiments, data structure DS includes a primary index PI that provides an unambiguous identification. For example, if multiple data structures or data sets that include data structure DS are present, they may be distinguished from one another using appropriate values for primary index PI. It is possible that for multiple data structures managed by a cryptography module 100 or data sets that include mapped data structure DS, an unambiguous value for stated primary index PI may be assigned for each data set.

Data structure DS may also preferably include a start address ADR1 that defines, for example, a memory address, in particular a start address, of a memory area 310*a*, 310*b*, 310*c* in memory device 300 (FIG. 1) optionally to be checked. For example, this may be a start address in memory device 300 at which a computer program, for example above-described bootloader BL or first computer program PRG1, is stored.

Data structure DS preferably includes a length indication LEN that indicates the length of memory area 310*a*, 310*b*, 310*c* in question. Data structure DS also preferably includes a status field IS that indicates an integrity status of the data set in question (for example, "checked" or "faulty" or the like, which is ascertainable, for example, as a function of the check according to step 400 from FIG. 3). Accordingly, result E of a check 400 of an individual computer program BL, PRG1 or of a memory area 310*a*, 310*b*, 310*c* may advantageously be stored in the form of status field IS.

Data structure DS particularly preferably includes a field REF-CMAC for accepting a CMAC reference value, which has been ascertained, for example, at a manufacturing time for a computer program, for example bootloader BL, that is stored in memory device 300.

From this point forward, this CMAC reference value may be utilized by cryptography module 100 for checking the authenticity or integrity of a computer program that is present in memory device 300 or memory area 310 in question at the point in time of the check.

In further preferred specific embodiments, data structure DS may contain even further data fields DF, for example for accepting signature addresses, signature types, and references to corresponding root certificates and the like, and for at least temporarily storing overall result GE (FIG. 1) obtained, for example, in the form of an OR link of all (individual) results.

In further preferred specific embodiments, cryptography module 100, 100a, 100b may also keep a protocol or logfile concerning successful and/or unsuccessful checks 400, 450, 452, 454. For example, cryptography module 100, 100a, 100b may store an error entry if a check of a memory area 310a or software contained therein has failed (for example, recognized by a deviation of the ascertained CMAC value from the reference CMAC value). The logfile may preferably be additionally used for at least temporarily storing the results or the overall result, or also for persistence of these values (thus, for nonvolatile memories).

The principle according to the specific embodiments has the further advantages stated below: a) manipulations (as well as error-related changes) of the content of memory device 300, for example manipulations of computer programs, such as a bootloader or the like, stored therein, may be efficiently detected during runtime of cryptography module 100 and computing device 200 (runtime manipulation detection (RTMD)) without impairing the operation of computing device 200, b) secure booting (i.e., startup) of software on computing device 200, for example application software, is ensured ("trusted boot," for example by early checking of bootloader BL), c) computer programs or other data that are subsequently stored in memory device 300 may advantageously also be subsequently checked according to the principle according to the specific embodiments ("secure flashing"), d) access to cryptographic keys and other sensitive information optionally provided by the cryptography module is controllable as a function of the check according to the specific embodiments ("security access"), e) a boot sequence (sequence of the execution of computer programs upon starting processing unit 200) may be arbitrarily selected without adversely affecting security, f) by the use of cryptography module 100, optionally including a dedicated cryptography unit 140, powerful and secure cryptographic functions, for example CMAC formation, may be provided, for example based on the 128-bit Advanced Encryption Standard (AES), g) due to providing reference layouts, for example in the form of data structure DS according to FIG. 7, the operation of cryptography module 100 may be flexibly adapted to different memory layouts and other configurations of computing device 200.

What is claimed is:

1. A cryptography module for a computing device, the cryptography module configured to:
    perform a check operation that produces a result, the checking operation checking at least one memory area of a memory device which is accessible by the computing device; and
    store the result at least temporarily, wherein the result indicates whether a change has occurred in a content of the at least one memory area on account of a manipulation or an error, and wherein the cryptography module checks multiple memory areas of the memory device, the cryptography module checking the multiple memory areas at least occasionally in a random or pseudorandom sequence, and wherein the cryptography module is configured to carry out the check of the at least one memory area using a cypher-based message authentication code (CMAC).

2. The cryptography module as recited in claim 1, wherein the cryptography module is configured to periodically check multiple memory areas of the memory device.

3. The cryptography module as recited in claim 1, wherein the cryptography module is configured to store at least temporarily the result of the check in a volatile and/or nonvolatile manner.

4. The cryptography module as recited in claim 1, wherein the result of the check of a memory area of the at least one memory area includes at least one truth value that characterizes the result of the check.

5. The cryptography module claim 4, wherein the cryptography module is configured to periodically check multiple memory areas of the memory device, wherein the result of the check of a memory area of the multiple memory areas includes at least one truth value that characterizes the result of the check, and wherein multiple truth values that are associated in each case with checked memory areas of the memory device as the result undergo an OR link in order to ascertain an overall result, the overall result characterizing whether at least one result of the multiple checked memory areas of the memory device is negative.

6. The cryptography module as recited in claim 5, wherein the cryptography module is configured to store at least temporarily the overall result in a volatile and/or nonvolatile manner.

7. The cryptography module as recited in claim 5, wherein the cryptography module is configured to initiate an error response when the overall result is negative, the error response including at least one of the following measures: a) resetting the computing device, and/or resetting the computing device and the cryptography module, b) transmitting an interrupt request to the computing device, c) blocking an access of the computing device to cryptographic keys that are stored in the cryptography module or providable by the cryptography module and/or to other first data, d) preventing the execution of a bootloader of the computing device by holding in a reset state the computing device, e) providing the overall result for the computing device and/or transmitting the overall result to the computing device.

8. The cryptography module as recited in claim 1, wherein the cryptography module includes a memory unit integrated into the cryptography module, for storing at least one reference value and/or a reference layout for the at least one memory area.

9. The cryptography module as recited in claim 8, wherein the cryptography module is configured to carry out the check as a function of the reference value.

10. The cryptography module as recited in claim 1, wherein the cryptography module is configured to establish within the scope of the check whether the content of the at least one memory area corresponds to a predefinable memory content.

11. The cryptography module as recited in claim 1, wherein the at least one memory area includes a bootloader for the computing device for execution on the computing device.

12. The cryptography module as recited in claim 1, wherein the cryptography module is configured to provide the computing device with first data, the first data being cryptographic keys, the cryptography module being configured to provide the computing device with the first data only partially, or not at all, as a function of the check.

13. A method for operating a cryptography module for a computing device, the method comprising the following steps:

performing, by the cryptography module, a checking operation that produces a result, the checking operation checking at least one memory area of a memory device accessible by the computing device to obtain a result of the check; and at least temporarily storing the result, wherein the result indicates whether a change has occurred in a content of the at least one memory area on account of a manipulation or an error, and wherein the cryptography module checks multiple memory areas of the memory device, the cryptography module checking the multiple memory areas at least occasionally in a random or pseudorandom sequence, and wherein the cryptography module is configured to carry out the check of the at least one memory area using a cypher-based message authentication code (CMAC).

14. The method as recited in claim 13, wherein the cryptography module stores the result of the check, at least temporarily, in a volatile and/or nonvolatile manner.

* * * * *